Jan. 30, 1923.
C. T. CHAPMAN.
CUTTER HEAD FOR COAL DRILLS.
FILED MAR. 17, 1922.
1,443,344
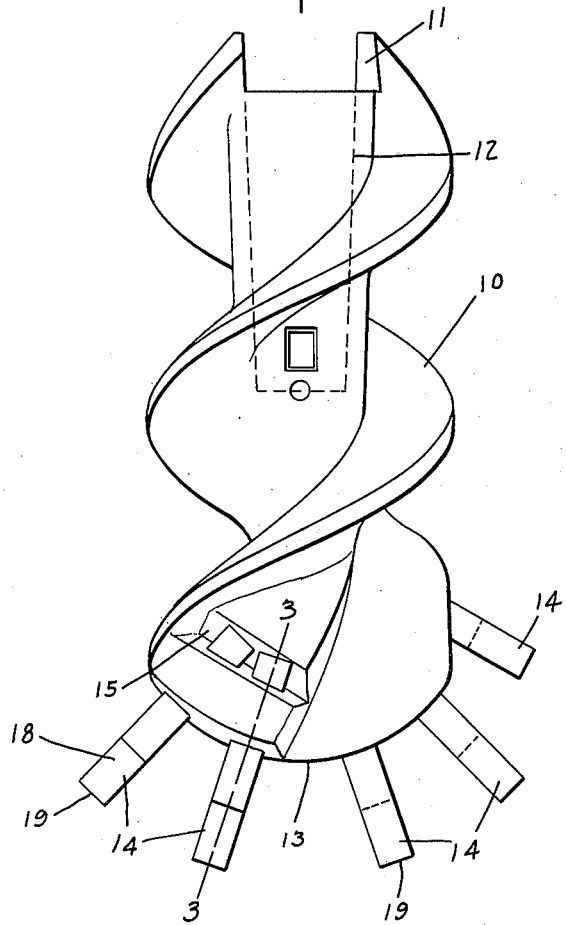
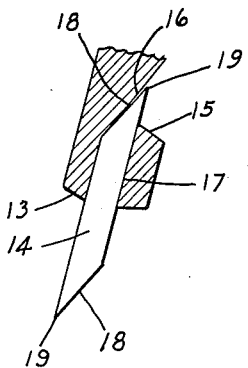
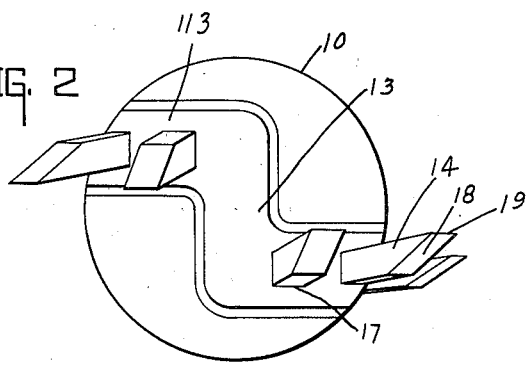
INVENTOR.
CHARLES T. CHAPMAN.
BY
ATTORNEYS.

Patented Jan. 30, 1923.

1,443,344

UNITED STATES PATENT OFFICE.

CHARLES T. CHAPMAN, OF TERRE HAUTE, INDIANA.

CUTTER HEAD FOR COAL DRILLS.

Application filed March 17, 1922. Serial No. 544,559.

*To all whom it may concern:*

Be it known that I, CHARLES T. CHAPMAN, a citizen of the United States, and a resident of Terre Haute, county of Vigo, and State of Indiana, have invented a certain new and useful Cutter Head for Coal Drills; and I do hereby declare that the following is a full, clear, and exact description thereof, reference being had to the accompanying drawings, in which like numerals refer to like parts.

This invention relates to a drill which is particularly designed for drilling blast holes in coal mines and the like and is of the type described in Patent No. 1,228,296, dated May 29, 1917.

The chief object of the invention is to provide a drill which includes a screw conveyor body portion with a plurality of removable bits, which bits are reversible and identical.

In the structure shown in the prior patent the bits necessarily were curved to secure the best cutting results, and when straight said bits merely scraped. With the offset positioning of the bit supporting drill portion, as shown herein, the bits can be made straight and secure the same or better cutting results than were secured with the curved bits.

The full nature of the invention will be understood from the accompanying drawings and the following description and claims.

In the drawings, Fig. 1 is a side elevational view of a drill bit construction embodying the features of the invention. Fig. 2 is an end view of the same. Fig. 3 is a sectional view taken on the line 3—3 of Fig. 1.

In the drawings 10 indicates a spiral, helical or screw body conveyor which terminates in a jaw 11, and said jaw is adapted to receive a supporting rotating member, the free end of which is receivable by the socket 12. The screw body terminates in an arcuate face or end 13, and herein there is illustrated a plurality of cutters or bits 14, which extend outwardly from said arcuate end and preferably radially. The opposite sides of the spiral conveyor are suitably recessed, as at 15 to form an abutment or face 16, and extending from the groove 15 and communicating therewith and opening upon the arcuate face 13 are a plurality of cutter or bit receiving channels 17.

Each of the cutters is identical, and therefore, a description of one will suffice for an understanding of them all. The cutter 14 is preferably of tool steel, square in cross section and provided with a pair of parallel cutting faces 18 which terminate in an outer cutting edge 19. As shown clearly in Fig. 3, the cutting edge 19 which extends into the groove 15 does not engage the abuttable face 16, but the face 18 of the cutter abuts said face 16 and prevents further inward movement of the bit or cutter. It will likewise be perceived from Fig. 3 that the cutters are reversible as well as readily removable. This construction provides that but half the requisite number of cutters are necessary, since the cutting edges 19 on each end when dull can be replaced by reversing the cutter and presenting the other edge 19.

The construction herein described retains all of the quick detachable features and also the other features enumerated in the prior patent referred to.

As shown in Fig. 2 the arcuate face comprises a central portion 13 and two wing portions 113, which carry the cutters 14.

The invention claimed is:

1. In a drill structure, the combination of a body portion having a bit receiving channel therein, an abutting face extending angularly of the channel, and a reversible bit having ends substantially parallel and providing an outer cutting edge on each end and seatable in said channel and having one end other than the cutting edge engageable upon said abutting face.

2. In a drill structure, the combination of a screw conveyor body portion, a transverse groove in opposite faces of the body portion near the ends thereof, said body portion having a plurality of outwardly extending channels which extend from the body end to the groove, and a reversible bit seatable in each channel and bearable upon a wall of said groove.

3. In a drill structure, the combination of a screw conveyor body portion having an arcuate end, a transverse groove in opposite faces of the conveyor body portion, said body portion having a plurality of outwardly extending identical channels which terminate in said groove and said arcuate end, and a plurality of identical reversible bits, each seatable in one of said channels and having one end bearable upon a wall of a groove.

4. In a drill structure, the combination of a screw body portion having an arcuate end with two offset wing portions, a transverse groove in a face of said wing portion, a plurality of channels extending through said arcuate end and terminating in said groove, and a plurality of reversible bits detachably supported in said grooves.

In witness whereof, I have hereunto affixed my signature.

CHARLES T. CHAPMAN.